United States Patent [19]

Feyrer et al.

[11] Patent Number: 4,719,615
[45] Date of Patent: Jan. 12, 1988

[54] ERASABLE OPTICAL DATA STORAGE MEDIUM

[75] Inventors: Clyde D. Feyrer, Portland, Oreg.; N. Ross Gordon, Kennewick, Wash.; W. Eugene Skiens, Wilsonville, Oreg.

[73] Assignee: Optical Data, Inc., Beaverton, Oreg.

[21] Appl. No.: 835,960

[22] Filed: Mar. 4, 1986

Related U.S. Application Data

[63] Continuation-in-part of Ser. No. 525,813, Aug. 22, 1983, abandoned.

[51] Int. Cl.⁴ .............................................. G11B 7/24
[52] U.S. Cl. .................................. 369/284; 369/100; 369/286; 369/288; 346/76 L; 346/135.1
[58] Field of Search ............... 369/100, 111, 275, 284, 369/286, 288; 346/76 L, 135.1, 137, 77 E; 365/126, 120, 127, 124; 358/344

[56] References Cited

U.S. PATENT DOCUMENTS

| | | | |
|---|---|---|---|
| 3,689,768 | 9/1972 | Sato | 346/135.1 |
| 3,787,873 | 1/1974 | Sato | 346/76 L |
| 4,264,986 | 4/1981 | Willis | 365/124 |
| 4,268,575 | 5/1981 | Shinozoki | 346/76 L |
| 4,278,734 | 7/1981 | Ohta | 365/127 |
| 4,282,534 | 8/1981 | Shinozoki | 346/76 L |
| 4,285,056 | 8/1981 | Bell | 369/100 |
| 4,320,489 | 3/1982 | Crandall | 369/111 |
| 4,336,545 | 6/1982 | Howe | 346/135.1 |
| 4,360,895 | 11/1982 | Cornet | 365/127 |
| 4,371,954 | 2/1983 | Cornet | 365/126 |
| 4,398,203 | 8/1983 | Cornet | 346/135.1 |
| 4,404,656 | 9/1983 | Cornet | 365/126 |
| 4,405,994 | 9/1983 | Cornet | 365/126 |
| 4,430,659 | 2/1984 | Moffitt | 346/135.1 |
| 4,463,083 | 7/1984 | Kitajima | 346/135.1 |
| 4,478,782 | 10/1984 | Kuder | 369/284 |
| 4,554,655 | 11/1985 | Kumasaka | 369/275 |
| 4,578,788 | 3/1986 | Ahn | 369/275 |
| 4,647,947 | 3/1987 | Takeoka | 365/126 |

FOREIGN PATENT DOCUMENTS

| | | | |
|---|---|---|---|
| 57-60546 | 4/1982 | Japan | 369/100 |
| 58-62096 | 4/1983 | Japan | 369/100 |
| 58-94145 | 6/1983 | Japan | 369/100 |

OTHER PUBLICATIONS

*Elements of Materials Science*, 2nd. Ed., by Von Vlack, Addison–Wesley Publishing Co., ©1967, pp. 76, 77.

*Primary Examiner*—Alan Faber
*Attorney, Agent, or Firm*—Chernoff, Vihauer, McClung & Stenzel

[57] ABSTRACT

An erasable optical data storage medium including a substrate and a dual layer of a first material and a second material on the substrate. The dual layer is susceptible to expansion and contraction, to writing data thermally, to erasing data thermally and mechanically, and to reading data optically, the first material and the second material, respectively, being bonded together and remaining in the same physical state upon the expansion and relaxation of the dual layer. Methods and apparatus are also disclosed for recording data bits on the medium.

21 Claims, 14 Drawing Figures

WRITE MODE

WRITE MODE

WRITE MODE

ERASE MODE

ERASE MODE

READ MODE

READ MODE

ERASE/WRITE CYCLE
ERASE

ERASE/WRITE CYCLE
WRITE

ERASABLE OPTICAL DATA STORAGE MEDIUM

This is a continuation-in-part of application Ser. No. 06/525,813, filed on Aug. 22, 1983, now abandoned.

BACKGROUND OF THE INVENTION

1. Field of the Invention

The present invention relates generally to a data storage medium and methods and apparatus for recording data on the medium, and, more particularly, to an erasable optical data storage medium and methods and apparatus for writing, erasing, and reading data on the data storage medium.

2. Discussion of Background and Prior Art

Currently, the practical or commercial techniques for recording data are based substantially on magnetic storage technology. In general, the data are stored on magnetic media, such as discs and tapes, on which logic 1 data bits and logic 0 data bits are represented by the magnetization of a medium. For example, one direction of magnetization of a given location or bit storage area of the data storage medium can represent a logic 1, while another direction of magnetization of that bit storage area can represent a logic 0. Each data bit is written on the medium by using a recording head to magnetize the given bit storage area, and each data bit can be erased by writing another bit over the given bit storage area using the magnetic recording head. Each data bit is read by using the recording head to sense the magnetization of the given bit area.

While the magnetic storage technology is commercially successful and advantageous, since about early in the decade of the 1960's, a recording technique known generically as optical recording has been and continues to be considered a very promising alternative for storage data. Optical recording potentially has significant advantages over magnetic recording, including higher data storage density, higher data rates, and longer data archival capabilities. One type of optical recording that has the highest potential is an optical recording apparatus or system which uses, in lieu of the magnetic recording head, a highly focused laser beam as an ultra-fine recording stylus to write and read data at a very high data rate and recording density, and to erase the data. The system includes an erasable optical data storage medium that responds to the laser beam to store the data. For example, the data storage medium responds to the heat generated by the laser beam to erase and write the data, and responds to the light of the laser beam to read the data.

In one optical recording system, to write a data bit, a laser beam is focused on the erasable data storage medium to heat the medium and, thereby, induce a stable transition from one morphological or physical state, e.g., an amorphous state, to another morphological or physical state, to another morphological or physical state, e.g., a crystalline state. The two physical states have different optical properties which are the optical transmittance and optical reflectance properties of the respective states. Therefore, to read the data bit, light from the laser beam, which is at a lower power level than is used for writing, is focused on the data storage medium and will be transmitted or reflected by the medium depending on the physical state of the medium, thereby representing a logic 1 or logic 0. The data bit can be erased by again heating the material with the laser beam at a higher power level to return the medium to its original physical state.

The above-mentioned erasable optical data storage medium is made of semiconductor or chalcogenide materials that, as already stated, change from one state to another when heated. One problem with this data storage medium is that these changes in state are very small or slight, i.e., the amorphous and crystalline states are not substantially distinguishable optically. Therefore, a high signal-to-noise ratio of a reflected laser beam is not obtainable to distinguish between a logic 1 and a logic 0 upon reading the data bit. Another problem with this data storage medium is that the data rate, in particular the writing and erasing speeds, is undesirably very low, e.g., one microsecond. This results from the relatively long time that is required for a given material to undergo the change from one physical state to the other. Another problem is that a relatively high amount of laser energy or power is required to heat the material so that it can transform from one physical state to the other. Yet another problem is that due to this physical state transformation, the data storage medium will fatigue after a relatively few number of erase/write cycles. This fatigue factor will not be competitive with magnetic storage technology, which can achieve a number of erase/write cycles on the order of one million.

U.S. Pat. No. 4,278,734 to Ohta et al, discloses an optical medium in which the material of the medium changes physical state, leading to an increase or decrease in optical density. Ohta et al appears to have solved the data rate problem in that data may be written or erased quickly, e.g. in 50 nsec. Ohta et al also appears to have solved the contrast problem in that the physical states are distinguishable optically. However, one disadvantage of Ohta et al is that the data cannot be erased, bit-by-bit, since a localized bit area location cannot be achieved. Also, the physical change of state or transformation cannot occur on a surface which has anomalies or irregularities in the surface. Furthermore, the materials used for the optical medium are expensive.

U.S. Pat. No. 4,264,986 to Willis, issued Apr. 28, 1981, discloses another type or erasable optical data storage medium. To write a data bit, a laser beam is focused on the medium to induce, by heating, a volumetric expansion of the bit area being heated, thereby creating a small bump or deformation. The presence of the bump represents one logic state, while the absence of the bump represents the other logic state. Upon this heating, the bit area of the data storage medium changes from one physical state, i.e., crystalline, to another physical state, i.e., amorphous, which is the phenomenon that causes the volumetric expansion, thereby creating the small bump which becomes reversibly fixed. A bit is read by focusing on the bit area a laser beam of lower power than is used for writing, and then detecting the amount or scattering of reflected light. If the bump is present, the reflected light will be substantially scattered, so that the intensity of the detected light will be higher. This read/write recording method is attractive, since it provides a good signal-to-noise ratio to distinguish a logic 1 from a logic 0.

One problem with the erasable optical data storage medium of U.S. Pat. No. 4,264,986 is that the laser beam must raise the material to a high temperature, above the melting point, to erase or remove the bump. This has the disadvantage of requiring high-powered lasers. Moreover, this melting of the bump may not leave the surface of the medium smooth, i.e., ripples can form on the surface upon the cooling of the material. Such a smooth surface is needed to be able to continually reproduce a satisfactory bump for properly reading the data bit. Yet another problem is that the data rate is relatively slow due to the need for the change in physical state of the material of the medium, which is a function of relatively slow cooling rates. Furthermore, fatigue, resulting from the physical change of state, is a problem with this data storage medium in that the number of erase/write cycles which can be achieved is only about one thousand.

U.S. Pat. No. 4,371,954 to Cornet, issued Feb. 1, 1983, discloses an erasable optical data storage medium including a substrate, having a low coefficient of thermal expansion, which supports a dual layer having a bottom layer of material and a top layer of material. The bottom layer of material is a relatively inextensible metal or polymer having a high coefficient of thermal expansion, and the top layer is a metal alloy which is in a martensitic phase at ambient temperature and has a low coefficient of thermal expansion. Also, the bottom layer and top layer have a low adhesion to one another, i.e., they are not bonded together, and the latter has a transformation temperature $T_t$ above ambient and below the melting point of the former layer. Above the transformation temperature $T_t$, the top layer is in its "parent" phase.

To write a data bit, as described in U.S. Pat. No. 4,371,954, a light pulse from a laser beam is absorbed by the dual layer, resulting in the heating of the dual layer at a temperature below the transformation temperature $T_t$, as well as a differential expansion between the two layers. The bottom layer delaminates or disengages from the substrate and volumetrically expands onto the top layer which forms a bump. Upon cooling, the top layer forms a reversibly fixed bump and the bottom layer contracts back onto the substrate.

To erase the data bit, as described in U.S. Pat. No. 4,371,954, the martensitic top layer is raised to a temperature exceeding the transformation temperature $T_t$, either by, for example, a higher power laser pulse or a slower displacement or movement of the data storage medium across the laser beam, thereby transforming the top layer to its parent phase. The top layer then contracts onto the bottom layer and, upon cooling, returns to its martensitic phase.

One problem with the erasable optical data storage medium of U.S. Pat. No. 4,371,974 is that the metallic dual layer, and in particular the bottom layer, is relatively inextensible. Consequently, the bump that can be produced is not as high as is desirable for accurately reading the data bit. Another problem is that the top layer must change between the martensitic phase and the parent phase for erasing the data but not for writing the data. One disadvantage of this change of phase is that the erase mode is slow and, concomitantly, cannot occur as quickly as the write mode, thereby requiring significantly different data rates for the respective modes. Another disadvantage is that different laser power pulses are required for writing and erasing the data bit, with the latter being significantly higher, thereby requiring the use of high-powered lasers.

Yet another problem with U.S. Pat. No. 4,371,954 is that the erasable optical data storage medium is highly susceptible to hard bit errors which are errors resulting from imperfections in the medium. More particularly, any anomalies or irregularities in the surface of the medium will affect the ability of the top layer to change between the martensitic and parent phases, resulting in bit errors. Still another problem results from the top layer being metallic or a metal alloy having a low thermal coefficient of expansion. This means that higher power light pulses are needed to expand this type of material, thereby again requiring high-powered lasers. Another problem is that the bottom layer disengages from the substrate upon writing a data bit. This has the disadvantage of enabling the bottom layer to "creep" about the substrate, thereby creating imperfections during use of the medium and preventing the medium from remaining smooth.

SUMMARY OF THE INVENTION

It is an object of the present invention to provide a novel data storage medium.

It is another object of the present invention to provide novel methods and apparatus for optically recording data.

Yet another object of the present invention is to provide an erasable optical data storage medium for storing data at a high data rate.

Another object of the present invention is to provide an erasable optical data storage medium for storing data using inexpensive low-power light sources.

Still another object of the present invention is to provide an erasable optical data storage medium having cycling characteristics competitive with magnetic storage technology.

It is another object of the present invention to use the erasable optical data storage medium in conjunction with any of a plurality of desired wavelengths.

Yet another object of the present invention is to be able to record data on a medium having irregularities or anomalies.

To achieve the foregoing and other objects in accordance with the purposes of the present invention, as embodied and broadly described herein, an erasable optical data storage medium of the present invention comprises a substrate, and a dual layer of a first material and a second material on the substrate, the dual layer being susceptible to expansion and relaxation, to writing data thermally, to erasing data thermally and mechanically, and to reading data optically, the first material and the second material being bonded together, and the first material and the second material, respectively, remaining in the same physical state upon the expansion and relaxation of the dual layer.

In another aspect, the present invention is a method for writing data on an erasable optical data storage medium having a substrate and a dual layer on the substrate of a first material and a second material bonded together, the first material being elastic and the second material having a glass transition temperature, comprising heating the second material above the glass transition temperature to make the second material rubbery, heating the first material to elastically expand the first material within the elastic limit of the first material, allowing the heated first material to expand and push up the heated second material while the heated first material expands elastically, and cooling the expanded second material below the glass transition temperature while the first material is in an expanded condition, the cooled second material then forming a reversibly fixed deformation and holding the first material in the stretched, expanded condition.

In still another aspect, the present invention is a method of recording data on an erasable optical data storage medium having a substrate and a dual layer of a first material and a second material on the substrate, the dual layer corresponding to one data bit stored at one bit area on the erasable optical data storage medium, comprising the steps of erasing the one data bit stored at the one bit area, including heating the second material, and writing another data bit at the one bit area while the second material has not yet cooled.

Yet another aspect of the present invention is an apparatus for recording a data bit, comprising an erasable optical data storage medium including a substrate and a dual layer of a first material and a second material on the substrate, the dual layer being susceptible to expansion and relaxation, to writing data thermally, to erasing data thermally and mechanically, and to reading data optically, the first material and the second material being bonded together, and the first material and the second material, respectively, remaining in the same physical state upon the expansion and relaxation of the dual layer, means for generating a first laser beam and a second laser beam, the first material being absorptive of, and the second material being substantially transparent to, the first laser beam, and the second material being absorptive of the second laser beam, means for focusing the first laser beam on the first material to heat and thermally expand the first material onto the second material to write the data bit, means for focusing the second laser beam on the second material to heat the second material and to erase the data bit, and means for moving the erasable optical data storage medium relative to the first laser beam and the second laser beam.

Among many advantages to be described fully below, the present invention will write, erase and read data at high data rates, using low-power light sources such as lasers, and have a number of erase/write cycles that is competitive with magnetic storage technology.

BRIEF DESCRIPTION OF THE DRAWINGS

The accompanying drawings, which are incorporated in and form a part of the specification, illustrate embodiments of the present invention, and together with the description, serve to explain the principles of the invention. In the drawings.

DETAILED DESCRIPTION OF THE INVENTION

Reference will now be made in detail to the present preferred embodiments of the invention, examples of which are illustrated in the accompanying drawings.

Figure 1:
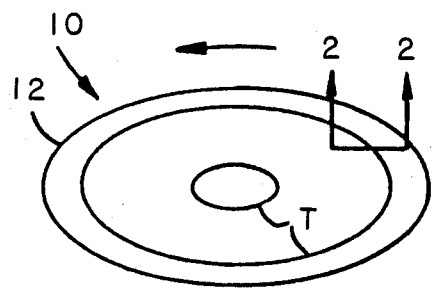
FIG. 1 is a view in perspective of a data storage medium of the present invention.

FIG. 1 illustrates generally an erasable data storage medium 10 for storing data words in which each of the data words has a plurality of bits that are a logic 1 or a logic 0. The erasable data storage medium 10 can be an erasable optical data storage disc 12 which stores the data words over a plurality of concentric tracks T or, for example, tapes, cards or other such storage media. The optical disc 12 also may be rotatable as in the direction shown by the arrow for data recording purposes to be described below.

Figure 2:
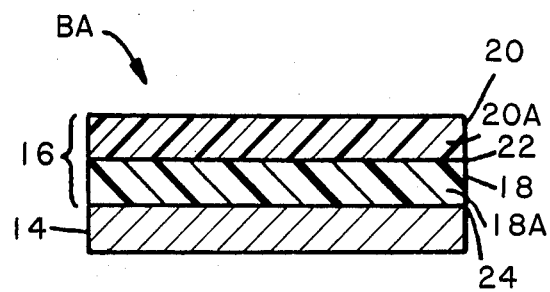
FIG. 2 is a section taken along lines 2—2 of FIG. 1 showing a bit area of the data storage medium in a relaxed condition.

FIG. 2 shows a section of a small bit area BA of the optical disc 12 for storing one data bit of logic 1 or logic 0. In particular, each bit area BA of the optical disc 12 includes a substrate 14 and a dual layer 16 deposited on the substrate 14. As will be further described, the dual layer 16 is susceptible to expansion and relaxation, to writing data thermally (expansion), to erasing data thermally and mechanically (relaxation), and to reading data optically. FIG. 2 shows the dual layer 16 in a condition of relaxation corresponding to one logic state, e.g., logic 0, whereas FIG. 3 shows the dual layer 16 in the condition of expansion representing the other logic state, e.g., logic 1.

The dual layer 16 has a bottom layer 18 of one material 18A and top layer 20 of another material 20A. Neither the material 18A nor material 20A changes physical state upon expansion or relaxation of the dual layer 16. The material 18A and material 20A are bonded together at their interface 22, so as to, for example, erase a data bit at a high data rate, as will be further described. In addition, the material 18A is deposited on the substrate 14 such that at their interface 24, material 18A does not delaminate from substrate 14 upon expansion of the dual layer 16, as shown in FIG. 3. This substantially eliminates any "creep" of layer 18 about substrate 14, whereby the bit area BA will remain smooth over repeated erase/write cycles, as will be further described. Thus, as illustrated in FIG. 3, upon expansion of the dual layer 16, and as a result of the bonding at interface 22 and at interface 24, material 18A and material 20A will continue to be bonded together, while material 18A will still be in contact with, or not have delaminated from, substrate 14.

Figure 3:
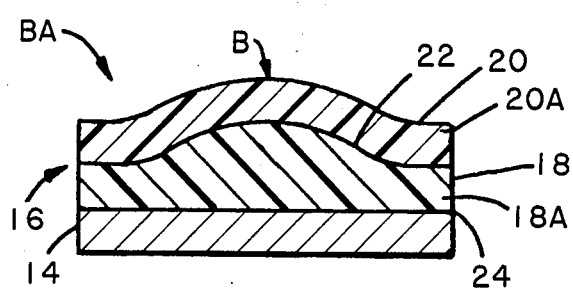
FIG. 3 is a view similar to FIG. 2 showing an expanded condition of the data storage medium.

FIG. 3 shows that the material 18A and the material 20A are deformed during expansion and, consequently, mechanical forces are produced in response to the expansion of the dual layer 16. As will be further described, these forces function, in part, to relax the dual layer 16 to the condition shown in FIG. 2 for purposes of quickly erasing a data bit.

Material 18A has (1) low thermal conductivity, (2) a high coefficient of thermal expansion, (3) a glass transition temperature, $T_g$, considerably below the glass transition temperature of material 20A, below which material 18A is glassy. That is, in connection with property (3), the material 18A may be rubbery at ambient temperature as opposed, for example, to being in a glassy or brittle condition. This means that only relatively low-power heating is required to heat the rubbery material, resulting in localized, extensive or large, and rapid expansion of the material 18A due to these three properties, respectively. Also as a result of this localized expansion, high data storage density can be achieved. Material 18A also may be relatively highly cross-linked, so that upon expansion there is substantially no viscous flow of this material. In addition, material 18A is elastic, having a high yield strain, so that upon being held in an extended state, it will not exceed its elastic limit. Other properties and characteristics of material 18A will be described below.

Material 20A has (1) a glass transition temperature, $T_g$, considerably above that of material 18A, for example 100° C., which is higher than ambient temperature. Thus, at ambient or normal temperatures material 20A is glassy or brittle, but when heated above the glass transition temperature, $T_g$, immediately transforms through a leathery or pliable condition into a rubbery condition. Material 20A also has (2) a relatively low thermal conductivity. Therefore, low-power heat can be used to quickly and locally, but only slightly, expand material 20A due to these properties.

Material 20A may be either lightly cross-linked or depend upon chain entanglements to prevent excessive flow, and may thus be either thermoplastic or thermoset with a relatively low yield strain. Therefore, upon expansion, the cross-linking or entanglements limits the viscous flow and a stretching of material 20A occurs.

Furthermore, material 20A has a modulus of elasticity that varies with temperature. The modulus decreases with increasing temperature. This results in a reversible viscoelastic strain being induced very quickly at low light power, which holds the bump B, as shown in FIG. 3.

Substrate 14 is a material that may, but not necessarily, have a low coefficient of thermal expansion.

Layer 18 and layer 20 are optically coupled, so that substantially all the light that is propagated through layer 20 is absorbed in layer 18. This optical coupling is provided by the material 20A having about the same index of refraction as material 18A. Thus, since substantially all this light can be coupled through top layer 20 to bottom layer 18, there is no loss of light, and therefore, lower power light sources can be used.

Material 18A and material 20A are also capable of being optically tuned to any of a plurality of desired or given wavelengths of light. To accomplish this tuning, material 18A and material 20A can each constitute a light-transparent material that has added to it a dye or pigment to cause the respective material 18A and material 20A to absorb the given wavelength of light. For reasons to be discussed more fully below, material 18A and material 20A will be tuned to absorb different wavelengths of light with material 20A being substantially, but not entirely, transparent to the wavelength of light that can be absorbed by the material 18A. This optical tuning has the advantage of making the optical data storage medium 12 highly flexible in that it can be tuned to operate with a variety of different laser sources that are currently available and inexpensive or that might be available in the future.

WRITE MODE

Figure 4A:
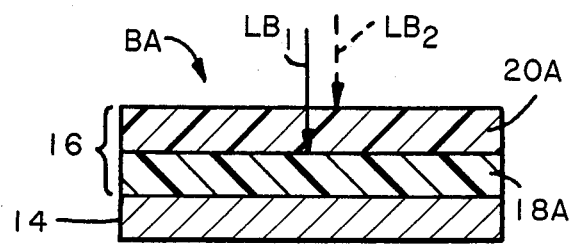
FIG. 4A-FIG. 4C are views, similar to FIG. 2 and FIG. 3, used to explain a write mode of the present invention.
Figure 4B:
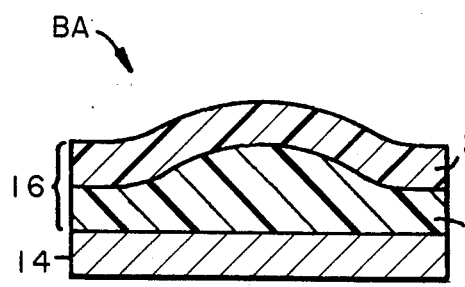
Figure 4C:
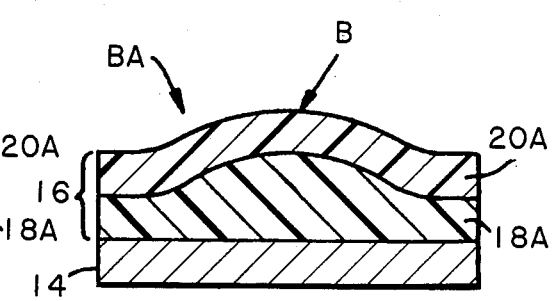

FIG. 4A–FIG. 4C illustrate a method for writing a data bit thermally at the bit area BA. With reference to FIG. 4A, assume that the bit area BA of the erasable optical data storage medium 12 is in the relaxed condition described in connection with FIG. 2. In this relaxed condition, at ambient temperature, as previously mentioned, material 18A may be above its glass transition temperature, $T_g$, and, therefore, rubbery, whereas material 20A is below its glass transition temperature, $T_g$, and, therefore, glassy. Also, at this time, none of the mechanical forces mentioned above have been produced. Furthermore, the material 18A and material 20A have the other properties and characteristics previously described, including, for example, material 18A and material 20A being high yield strain and lower yield strain, respectively.

Then, to write a data bit thermally, the method includes heating the material 18A to expand the material 18A within its elastic limit. At this time of heating material 18A, the material 20A also is heated above its glass transition temperature, $T_g$, which makes the material 20A rubbery. Preferably, as shown in FIG. 4A, the heating of material 18A and material 20A is accomplished by generating a laser beam $LB_1$ that has a wavelength which is substantially transparent to the material 20A and absorptive by the material 18A, and focusing the laser beam $LB_1$ through the material 20A onto the material 18A. The light of the laser beam $LB_1$ may be slightly absorbed by the material 20A to produce the heat for making this material 20A leathery or rubbery and is substantially absorbed by material 18A for thermally expanding the material 18A onto the material 20A.

Then, as shown in FIG. 4B, the next step is allowing the heated material 18A to expand and push up the heated material 20A creating a deformation or bump, while the heated material 18A expands. The next step, shown in FIG. 4C, includes cooling the expanded material 20A below its glass transition temperature, $T_g$, while the material 18A is in the expanded condition. Upon cooling, the material 20A forms a reversibly fixed deformation or bump B and holds the material 18A in the expanded condition. Thus, at this time, a data bit of one logic level, e.g., logic 1 has been written with the bit area BA being in the expanded condition described in connection with FIG. 3. If a logic 0 were to be written at the bit area BA, then laser beam $LB_1$ would not be actuated and the bit area BA would remain in the relaxed condition shown in FIG. 2.

As an alternative to the above-described heating step, in which material 20A slightly absorbs the light of the laser beam $LB_1$, material 20A may absorb no such light. Rather, a small amount of the heat that is absorbed in material 18A is conducted or transferred to material 20A to heat the latter above its glass transition temperature, $T_g$.

As another alternative to the heating step shown in FIG. 4A, in which only the laser beam $LB_1$ is used, the method can include first heating the material 20A above its glass transition temperature, $T_g$, by generating a laser beam $LB_2$ shown in dotted lines and focusing the laser beam $LB_2$ on the material 20A. The laser beam $LB_2$ is of a wavelength that is substantially absorbed by material 20A. Immediately thereafter, the laser beam $LB_1$ is actuated and focused on the material 18A as described above, with the method for writing the data bit thermally continuing also as described above. One advantage to using the laser beam $LB_2$ initially is to more quickly bring the material 20A to a rubbery condition and, thereby, be able to write a data bit more quickly.

ERASE MODE

Figure 5A:
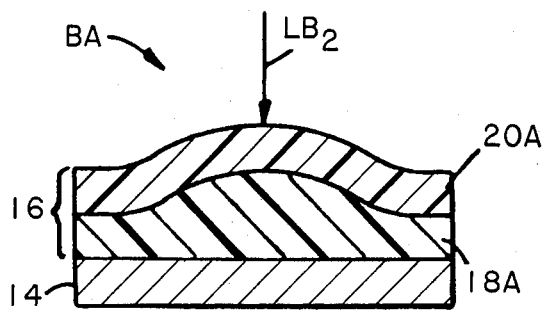
FIG. 5A-FIG. 5B are views, similar to FIG. 2 and FIG. 3, used to explain an erase mode of the present invention.
Figure 5B:
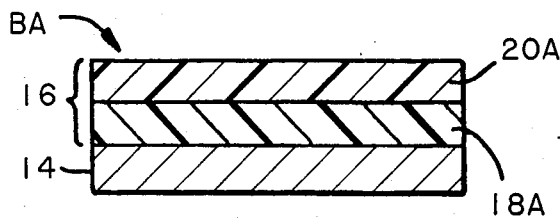

FIG. 5A–FIG. 5C disclose the method for erasing a data bit thermally and mechanically. Assume that the bit area BA has a data bit written as illustrated in FIG. 5A, which shows the same expanded condition for the bit area BA as in FIG. 4C in which the material 20A is holding the material 18A in an expanded condition at ambient temperature. Then, the method includes heating the material 20A to a temperature above the glass transition temperature, $T_g$, to make the material 20A rubbery. This heating of the material 20A, as shown in FIG. 5A, can be accomplished by generating and focusing the laser beam $LB_2$ onto material 20A. The heating of material 20A causes a relaxation of the holding by the material 20A of the material 18A, thereby allowing the mechanical forces previously mentioned to rapidly return the bit area BA to the relaxed condition shown in FIG. 4A. In particular, the elastic force in the material 18A assists in causing a quick return of the dual layer 16 to the relaxed condition. Upon this relaxation, the material 20A and the overall dual layer 16 returns to the fully relaxed condition, as shown in FIG. 5B and as was described in connection with FIG. 2. The dual layer 16, upon cooling, returns to a smooth condition.

Moreover, and as indicated above, the dual layer 16 has a relaxation time which is dependent, in part, on forces produced in response to the viscoelastic properties of the material 18A.

READ MODE

Figure 6A:
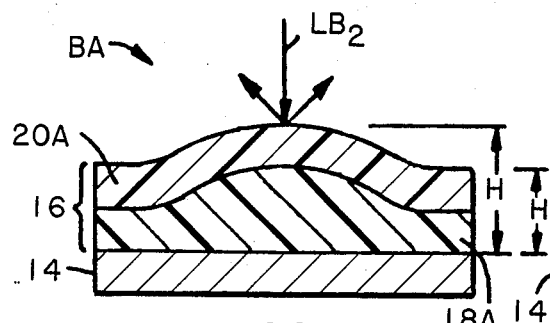
FIG. 6A-FIG. 6B are views, similar to FIG. 2 and FIG. 3, used to explain a read mode of the present invention.
Figure 6B:
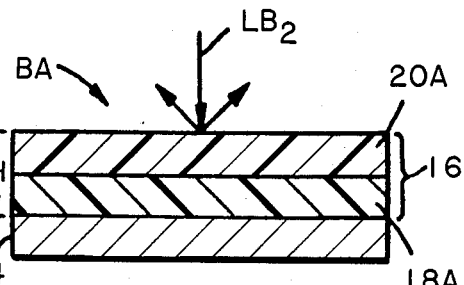

FIG. 6A-FIG. 6B illustrate a method of reading a data bit optically. Assume that a data bit, for example, a logic 1, has been written at the bit area BA as shown in FIG. 6A in which the bump B has been formed, as described above. To read this data bit, the laser beam $LB_1$, which is at a lower power level than is used for writing or erasing the data bit, is generated and focused on the bump B of the material 20A. Similarly, assume a data bit of logic 0 has been written in the bit area BA, as shown in FIG. 6B, i.e., no bump B is produced. Again, the laser beam $LB_1$ at lower power level than is used for writing or erasing the data bit is generated and focused on the material 20A.

In both read instances, the light of laser beam $LB_1$ will be reflected from the material 20A. Due to the difference in thickness or height H between the expanded condition of dual layer 16 shown in FIG. 6A and the relaxed condition of the dual layer 16 shown in FIG. 6B, there is a phase shift between the light of laser beam $LB_1$ that is reflected from the material 20A, respectively. This phase shift or difference can be detected with a high signal-to-noise ratio to distinguish a logic 1 from a logic 0 bit. Alternatively, there will be a difference in amplitude of the reflected light between the FIG. 6A and FIG. 6B conditions of bit area BA. This difference in amplitude can be detected with a high signal-to-noise ratio as logic 1 and logic 0 bits, respectively. More light scattering and, hence, reduced amplitude will be detected in the FIG. 6A condition than the FIG. 6B condition.

ERASE/WRITE CYCLE

Figure 7A:
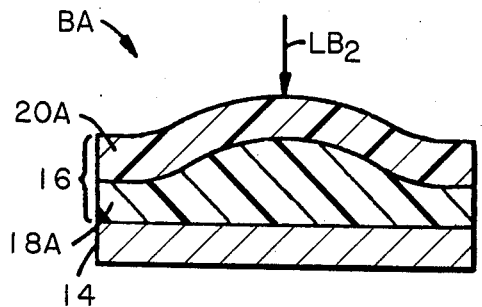
FIG. 7A-FIG. 7B are views, similar to FIG. 3, used to explain an erase/write cycle of the present invention.
Figure 7B:
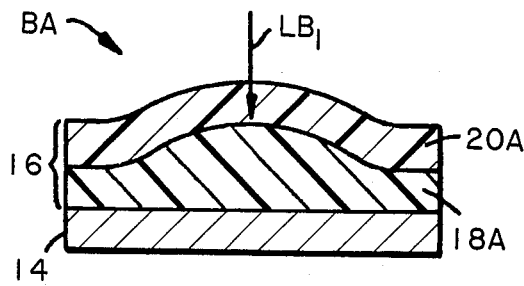

FIG. 7A-FIG. 7B are used to explain an erase/write cycle for erasing one data bit and writing another data bit at one bit area BA. As will be further described, the erase/write cycle occurs rapidly within the same view of an objective lens used to focus laser beam $LB_1$ and $LB_2$ on the material 18A and the material 20A, respectively, as the bit area BA moves across the lens.

Assume, as shown in FIG. 7A, that a bit has been written with bit area BA in the expanded condition. The erase/write cycle then includes first heating the material 20A at the bit area BA to erase the bit. The heating can be accomplished by generating and focusing the laser beam $LB_2$ on the material 20A to heat the material above its glass transition temperature, $T_g$, to a rubbery condition. Then, while the material 20A is still so heated, and before the dual layer 16 has relaxed, another data bit, e.g., a logic 1, is written at the bit area BA in the manner previously described for the Write Mode. This step of writing includes generating and focusing the laser beam $LB_1$ on the material 18A, as shown in FIG. 7B, whereby the thermal expansion previously described occurs, followed by the cooling of the material 20A. However, if a logic 0 were to be written during an erase/write cycle, then after heating the material 20A, as shown in FIG. 7A, the dual layer 16 is allowed to relax and cool as previously described for the Erase Mode.

The material 18A and the material 20A preferably are polymers, and particularly, amorphous polymers. Specifically, the material 18A can be, for example, elastomers having the above-mentioned thermoelastic properties and characteristics. The elastomers can include butyl rubbers, silicone rubbers, natural rubbers, ethylene-copolymers, polyurethanes, styrene-butadiene rubbers, and a number of other synthetic elastomers.

The amorphous polymers of the material 20A are those having the thermosetting or thermoplastic properties with characteristics mentioned above. These may include, for example, cellulose esters, polystyrenes, polysulfones, polycarbonates, polyacrylates, poly (vinyl acetates), polyamides and a wide variety of combinations thereof. Other amorphous polymers that can also be used include, for example, acrylic polymers, silicone copolymers, epoxy resins, alkyd resins, styrene copolymers, cellulose ethers, polyvinyl alcohol, and various other polymers.

Examples of colorants, dyes and pigments, that can be used to tune the material 18A and the material 20A are phthalocyanines, carbon blacks, azos (monoazo and disazo), anthroquinones, azines (nigrosenes) and xanthenes. Specifically, examples of colorants which are suitable are Sudan Black 60, Solvent Red 92, Solvent Blue 44, Solvent Blue 45, Neozapon Blue 807, Macrolex Blue RR, Perox Red 32, Heliogen Blue K, Phthalo Green E and mixtures thereof. Other examples of dyes might include some of those listed in U.S. Pat. Nos. 3,689,768, column 3, lines 1-22 and 4,336,545, column 8, lines 53-68. These patents are incorporated herein for reference to these types of dyes and pigments. Important features of suitable colorants are that they have not only good heat and light stability in the polymers systems used, but that they have very good compatibility with the polymer/solvent systems used to prepare the media (both materials 18A and 20A), such that bleeding, blushing, or phase separation do not occur as the coatings are formed.

Preliminary laboratory fabrication and testing procedures have been performed based on the above-mentioned principles of the present invention. For fabrication, an epoxy resin EPON 828 from Shell Chemical Company dyed with a red-orange dye, Savinyl RLS Scarlet manufactured by the Sandoz Corporation, New Jersey, was used for the material 20A. This material 20A was placed on a mandrel, coated with a release agent (polyvinyl alcohol), which was spun at 3,000 RPM resulting in a 3 micron thick layer 20A which was then cured. For the material 18A, Dow Corning 734, a clear silicone rubber, having a volumetric coefficient of thermal expansion of $920 \times 10^{-6}$ cm$^3$/cm$^3$/°C., was mixed with a carbon black pigment manufactured by the Cabot Corporation. The material 18A was then applied to the material 20A by using a "knife spread" technique. Then, the dual layer 16 was released or taken off the mandrel and mounted on a substrate 14 of aluminum.

The fabricated substrate 14 and the dual layer 16 were then mounted in a "single-shot" laser system having a Krypton laser at a wavelength of 647 nanometers. Then, to write a data bit, the laser was actuated for 50 nanoseconds using an electro-optical crystal, with the laser light then propagated through a shutter, a 25 micron pinhole and a 0.45 N.A. objective lens which was anti-reflective coated. The laser power was at 820–880 milliwatts, with about 20–30% of this power being provided at the dual layer 16. Bumps B were created in the range of 2.5–5 microns in diameter.

It was found that, even though the fabricated substrate 14 and the dual layer 16 were not optically smooth and had relatively large pits or valleys resulting from a nonuniform mandrel surface, the bumps B were also formed in these pits or valleys.

A similar fabrication and testing procedure for writing data bits, as described above, was performed in which the mandrel was spun at 7,500 RPM. This resulted in a thickness of 0.5 microns for the material 20A. Data bits were written with the Krypton laser being at about 150 milliwatts of power and about 40–45 milliwatts of this power being at the dual layer 16. Thus, it was found that less power was required for writing data bits on the second layer 20A of reduced thickness.

To erase the data bits written on the dual layer 16, a "single-shot" erase system having an Argon laser at a wavelength of 488 nanometers was used. The laser beam was modulated using an electro-optical modulator and was focused on bumps B through a microscope system using a 20× objective lens. The laser was operated at 1 microsecond pulse duration times and at 55 milliwatts of power, with about 11–12% of this power being applied at the dual layer 16. The bumps B were erased, as previously described.

The data bits that were written on the fabricated substrate 14 and the dual layer 16 were read using white light and a microscope to project images of the bumps B on a glass plate. Then, using a fiber optic bundle hooked to a photomultiplier, the intensity of the light at the glass plate was detected. It was found that a satisfactory contrast ratio of about 2:1 to 3:1 existed between areas of the glass plate having the bumps B and areas of the glass plate having no bumps B.

Figure 8:
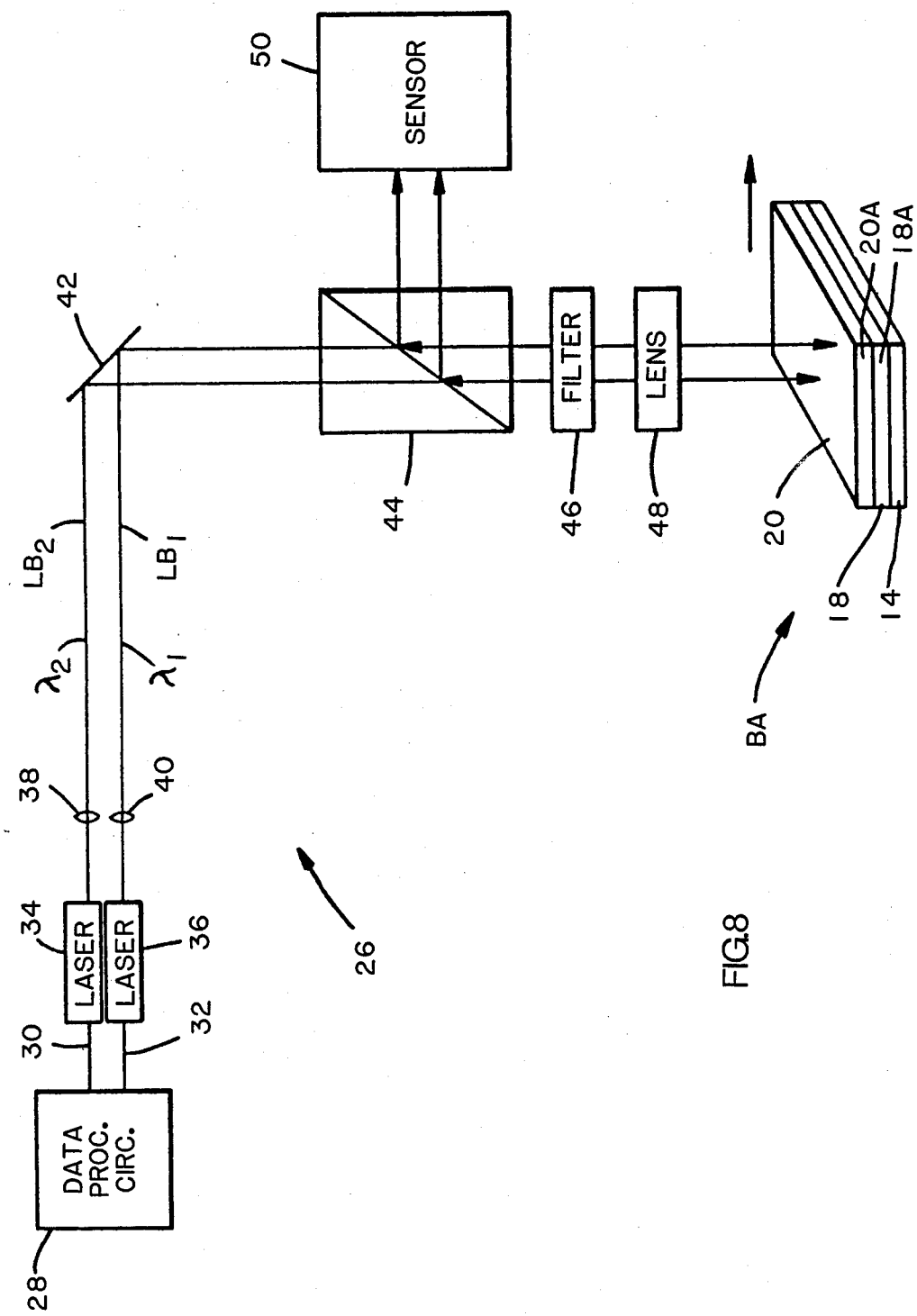
FIG. 8 is a block diagram of one embodiment of an optical recording apparatus of the present invention.

FIG. 8 illustrates one embodiment of a practical electro-optical system 26 for carrying out the optical recording of data on the erasable optical data storage medium 12. In particular, FIG. 8 shows one bit area BA, similar to the bit area BA shown in FIG. 2, for writing, reading and erasing a bit as described above.

Electro-optical system 26 includes a digital data processing circuit 28 whose outputs on respective lines 30 and 32 control respective pulsed variable-intensity lasers 34 and 36. Laser 34 outputs the laser beam $LB_2$ and laser 36 outputs the laser beam $LB_1$. A pair of lenses 38 and 40 collimate the laser beams $LB_2$ and $LB_1$, respectively, which are then reflected by a mirror 42 and propagated through a beam splitter 44.

The laser beam $LB_2$ and laser beam $LB_1$ are then passed through a filter 46 (e.g. ¼ waveplate) and then propagated through an objective lens 48 which focuses the laser beams on the moving bit area BA. Light reflected by the material 20A of bit area BA is collected by the lens 48 and propagated through filter 46 to the beam splitter 44, where the reflected light is then propagated to a light sensor 50.

As illustrated, laser beam $LB_2$ and laser beam $LB_1$ are spatially separated from one another. Also, the laser beam $LB_2$ is focused onto the bit area BA ahead of the laser beam $LB_1$ relative to the direction of movement of the bit area BA for erase/write purposes to be described below.

In the operation of the electro-optical system 26, assume that a bit has been written on the bit area BA, that this bit is to be erased and that another bit is to be written at the bit area BA. This will constitute an erase/write cycle. In describing this cycle, reference should be made to the above disclosure of the erase/write cycle of the present invention.

As the bit area BA moves across the view of the objective lens 48, the laser 34 is modulated by the output of the data processing circuit 28 on line 30 to produce a high intensity laser beam $LB_2$. The laser beam $LB_2$ is then focused on the material 20A by lens 48 to heat it to a rubbery condition. Then, while the material 20A is still rubbery, and with the bit area BA continuing to be in the same view of the objective lens 48, the laser 36 is immediately modulated by the output of data processing circuit 28 over line 32 to produce the laser beam $LB_1$. Consequently, the laser beam $LB_1$ is focused by the objective lens 48 onto the material 18A to heat it and cause the elastic expansion previously described. Thereafter, the bit area BA will move out of the view of the objective lens 48 and cool, so that either a logic 1 or a logic 0 will be written. In other words, the erase/write cycle can occur within one bit cell time, which means within the same view of the objective lens 48.

Assume now that instead of an erase/write cycle only an erase cycle is required, in which the bit written at the bit area BA is to be erased with no other bit written at the bit area BA. As the bit area BA moves within the view of the objective lens 48, the data processing circuit 28, via line 30, modulates the laser 34 to output a high intensity laser beam $LB_2$ which is then focused on the material 20A. Therefore, the material 20A is heated and then cools as the bit area moves outside the view of the objective lens 48. The result is that the bit will be erased in the manner previously described.

Assume now that it is desired to read a bit stored at the bit area BA, which bit is either a logic 1 or a logic 0. As the bit area BA moves within the view of the objective lens 48, the data processing circuit 28, via line 30, modulates laser 34 to produce a low intensity laser beam $LB_1$ that is focused on the material 20A. The reflected light is then collected by lens 48 and propagated by filter 48 and beam splitter 44 to sensor 50 which then detects the logic state of the bit. As previously mentioned, differences in phase or amplitude of the reflected light can be detected by sensor 50 to distinguish a logic 1 from a logic 0.

Figure 9:
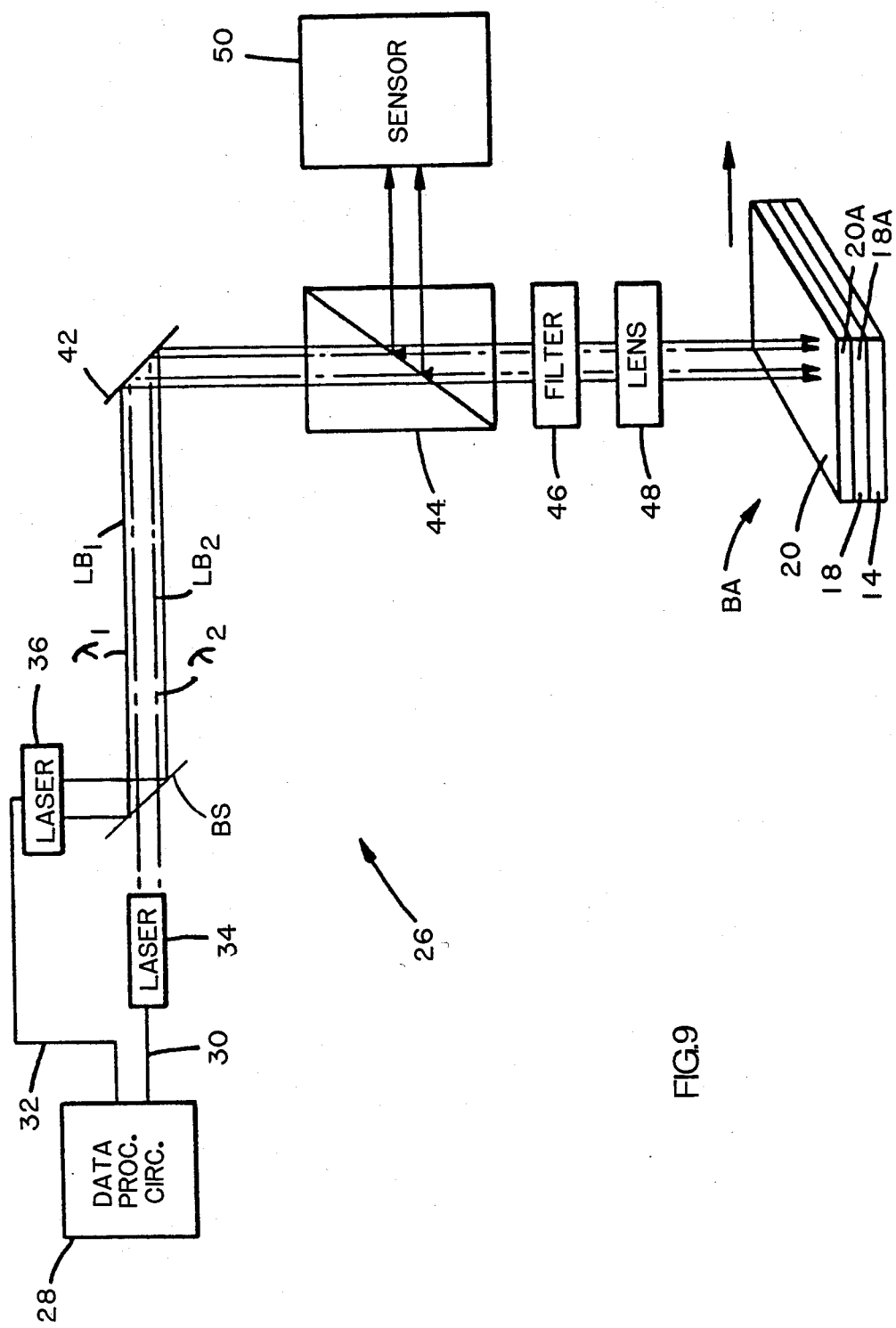
FIG. 9 is a block diagram of another embodiment of an optical recording apparatus of the present invention.

FIG. 9 is similar to FIG. 8 except that rather than having spatially separated laser beams $LB_1$ and $LB_2$, the two laser beams are concentric or co-linear. The co-linear beams $LB_1$ and $LB_2$ are propagated so that they are focused co-linearly on the material 18A and the material 20A as the bit area BA moves within the view of the objective lens 48. The co-linear laser beams $LB_1$ and $LB_2$ are produced by having laser 34 and laser 36 arranged, as shown, whereby light from each laser is propagated through a beam splitter BS. The erase/write cycle, the erase cycle and the read cycle in FIG. 9 are performed in a manner similar to that described for FIG. 8.

The foregoing description of preferred embodiments of the invention has been presented for purposes of illustration and description. It is not intended to be exhaustive or to limit the invention to the precise form described, and many modifications and variations are possible in light of the above teaching. The embodiments were chosen and described in order to best explain the principles of the invention and its practical application to thereby enable others skilled in the art to best utilize the invention in various embodiments and with various modification as are suited to the particular use contemplated. It is intended that the scope of the invention be defined by the claims appended hereto.

What is claimed is:

1. An optical recording medium comprising:
   (a) a first layer of a first material;
   (b) a second layer of a second material adjacent to said first material;
   (c) said first and second layers cooperating as a medium for forming an optically detectable deformation therein by thermal expansion of said first material without liquefaction or gasification of said first or second materials when said first layer is locally heated with light radiation of a first preselected wavelength;
   (d) said first material and said second material being sufficiently bonded to each other to enable said second layer to hold said first material in stretched, expanded condition upon cessation of said light radiation and cooling of said first material, retaining said optically detectable deformation, said second layer being sufficiently strong and rigid to hold said first material in stretched, expanded condition.

2. The medium of claim 1, said first and second layers further cooperating as an erasable optical recording medium for relaxing said optically-detectable deformation, without liquefaction or gasification of said first or second materials, when said second material is locally heated with light radiation of a second preselected wavelength.

3. The medium of claim 1 wherein said second material is adapted to substantially transmit light of said first preselected wavelength.

4. An optical recording medium comprising:
   (a) a first layer of a first material having a glass transition temperature ("$T_g1$");
   (b) a second layer of a second material bonded to said first material, said second material having a glass transition temperature ("$T_g2$") above ambient temperature and also above $T_g1$;
   (c) said first and second layers comprising a dual layer recording medium;
   (d) said first material having a high coefficient of thermal expansion;
   (e) said second material being adapted to permit localized thermal expansion of said first material when said second material is above $T_g2$ and adapted to retain said first material bonded thereto in an expanded configuration when said second material is cooled below $T_g2$; and
   (f) said dual layer recording medium being adapted to form and retain an optically-detectable deformation therein by localized thermal expansion of said first material, without liquefaction or gasification of said first or second materials, when locally heated with light radiation of a first preselected wavelength.

5. The medium of claim 4 wherein said dual layer recording medium is adapted to permit contraction of said first material from its expanded configuration when said second material is locally heated above $T_g2$ by light radiation of a second preselected wavelength.

6. The medium of claim 5 wherein said second material includes second light-sensitive means for absorbing energy from light radiation of said second preselected wavelength while substantially transmitting light radiation of said first preselected wavelength.

7. The medium of claim 6 wherein said second light-sensitive means includes a dye.

8. The medium of claim 5 wherein said expanded first material, upon contraction, assists said second material to relax said optically-detectable deformation in said dual layer recording medium.

9. The medium of claim 5 wherein said first material includes elastic means for relaxing said optically-detectable deformation by pulling upon said second material bonded thereto.

10. The medium of claim 4 wherein said first and second materials are polymers.

11. The medium of claim 4 wherein said first and second materials have relatively low thermal conductivity.

12. The medium of claim 4 wherein said first material includes first light-sensitive means for absorbing energy from light radiation of said first preselected wavelength.

13. The medium of claim 12 wherein said first light-sensitive means includes a dye.

14. The medium of claim 4 wherein said second material is adapted to substantially transmit light of said first preselected wavelength.

15. The medium of claim 4 wherein said first and second materials are not metals or metal oxides.

16. The medium of claim 4 wherein said first material is elastic, having a relatively high yield strain.

17. The medium of claim 4 wherein said second material is thermoplastic or thermoset with a relatively low yield strain.

18. The medium of claim 4 wherein said second material is glassy at ambient temperature but becomes rubbery when heated above $Tg2$.

19. An optical recording medium comprising:
   (a) a first polymer layer;
   (b) a second polymer layer bonded to said first layer;
   (c) said first layer having a high coefficient of thermal expansion and a first glass transition temperature ("$Tg1$"), said first layer adapted to produce a deformation due to localized thermal expansion upon heating;
   (d) said second layer having a glass transition temperature ($Tg2$) which is above ambient temperature and above $Tg1$, said second layer being adapted to permit localized thermal expansion of said first layer when said second layer is heated above $Tg2$ and adapted to retain said first layer in expanded configuration when said second layer is cooled below $Tg2$; and
   (e) said first and second layers cooperating as a medium for forming and retaining therein an optically-detectable deformation when locally heated with light radiation of a first preselected wavelength.

20. The medium of claim 19 wherein said second layer is adapted to local heating above $Tg2$ when exposed to light radiation of a second preselected wavelength, said first and second layers cooperating as a medium for permitting contraction of said first material from its expanded state and relaxing said optically-detectable deformation when said second material is locally heated by light radiation of said second preselected wavelength.

21. The medium of claim 19 wherein said first and second layers are adapted to cooperate to form and retain an optically-detectable deformation without liquefaction or gasification of said first or second layers.

* * * * *